(12) United States Patent
Hori et al.

(10) Patent No.: US 11,043,123 B2
(45) Date of Patent: Jun. 22, 2021

(54) DRIVING ASSISTANCE DEVICE, DRIVING ASSISTANCE METHOD, AND RECORDING MEDIUM

(71) Applicants: Toyota Jidosha Kabushiki Kaisha, Toyota (JP); Aisin AW Co., Ltd., Anjo (JP)

(72) Inventors: Takashige Hori, Aisai (JP); Makoto Akahane, Nagoya (JP); Ken Ishikawa, Nagakute (JP); Masatoshi Takahara, Okazaki (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 135 days.

(21) Appl. No.: 16/180,574

(22) Filed: Nov. 5, 2018

(65) Prior Publication Data

US 2019/0180617 A1 Jun. 13, 2019

(30) Foreign Application Priority Data

Dec. 8, 2017 (JP) .............................. JP2017-236284

(51) Int. Cl.
| | |
|---|---|
| *G08G 1/09* | (2006.01) |
| *B60W 30/18* | (2012.01) |
| *B60W 50/00* | (2006.01) |
| *G08G 1/0967* | (2006.01) |

(52) U.S. Cl.
CPC .. *G08G 1/096725* (2013.01); *B60W 30/18154* (2013.01); *B60W 50/0097* (2013.01); *B60W 2520/10* (2013.01); *B60W 2554/801* (2020.02); *B60W 2555/60* (2020.02)

(58) Field of Classification Search
CPC .......... G08G 1/096725; G08G 1/0112; G08G 1/0141; G08G 1/0129; G08G 1/0145; G08G 1/096775; G08G 1/09; G08G 1/095; B60W 30/18154; B60W 50/0097; B60W 2554/801; B60W 2555/60; B60W 2520/10; B60W 2556/45; B60W 30/16
See application file for complete search history.

(56) References Cited

U.S. PATENT DOCUMENTS

| | | | |
|---|---|---|---|
| 2014/0266798 A1* | 9/2014 | Witte | G08G 1/0112 340/907 |
| 2015/0329108 A1* | 11/2015 | Kodaira | B60W 10/20 701/41 |

FOREIGN PATENT DOCUMENTS

| | | |
|---|---|---|
| CN | 104011779 A | 8/2014 |
| CN | 104870293 A | 8/2015 |

(Continued)

*Primary Examiner* — Rodney A Butler
(74) *Attorney, Agent, or Firm* — Dinsmore & Shohl LLP (57) ABSTRACT

A driving assistance device communicates with an information processing device for providing driving assistance. The driving assistance device includes: an electronic control unit configured to: acquire signal information from the information processing device, the signal information indicating a time at which a traffic light on a traveling route displays a stop indication, the traveling route being a route on which a vehicle is traveling; make a prediction whether the vehicle should stop at the traffic light, based on a traveling state of the vehicle and the signal information; and perform the driving assistance and control an operation of the vehicle around the traffic light based on the prediction.

15 Claims, 6 Drawing Sheets

(56) References Cited

FOREIGN PATENT DOCUMENTS

| JP | 2011-154619 A | 8/2011 |
|---|---|---|
| WO | 2013060774 A1 | 5/2013 |

\* cited by examiner

DRIVING ASSISTANCE DEVICE, DRIVING ASSISTANCE METHOD, AND RECORDING MEDIUM

CROSS-REFERENCE TO RELATED APPLICATIONS

This application claims priority to Japanese Patent Application No. 2017-236284 filed on Dec. 8, 2017, which is incorporated herein by reference in its entirety including the specification, drawings and abstract.

BACKGROUND

1. Technical Field

The present disclosure relates to a driving assistance device, a driving assistance method, and a recording medium.

2. Description of Related Art

There is known a technique for performing deceleration control for the host vehicle when there is a plurality of preceding vehicles ahead of the host vehicle. This deceleration control is performed based on the information on a first vehicle group obtained from the roadside units, on the information on a second vehicle group estimated based on the vehicle speed of, and the distance to, the preceding vehicles obtained from the sensors mounted on the host vehicle, and on the signal cycle information acquired from the traffic lights (see Japanese Patent Application Publication No. 2011-154619 (JP 2011-154619 A)).

SUMMARY

Today, as a driving assistance technique for a driver who drives a vehicle, a technique called Adaptive Cruise Control (ACC) is known. ACC is a technique that allows a driver to autonomously drive a vehicle while maintaining a safe distance to the vehicle ahead. In addition, as an applied version of ACC, a technique is now under development for allowing two or more vehicles to travel in a line.

Incidentally, with the technique disclosed in Japanese Patent Application Publication No. 2011-154619 (JP 2011-154619 A), the deceleration control for the host vehicle is performed based on the state of the traffic light acquired directly from the traffic light. Therefore, the vehicles cannot be controlled in a place where the state of the traffic light cannot be acquired directly from traffic light.

The present disclosure provides a technique that can control vehicles without acquiring the state of a traffic light directly from the traffic light.

A driving assistance device according to one aspect of the present disclosure communicates with an information processing device for providing driving assistance. The driving assistance device includes pan electronic control unit configured to: acquire signal information from the information processing device, the signal information indicating a time at which a traffic light on a traveling route displays a stop indication, the traveling route being a route on which a vehicle is traveling; make a prediction whether the vehicle should stop at the traffic light, based on a traveling state of the vehicle and the signal information; and perform the driving assistance and control an operation of the vehicle around the traffic light based on the prediction.

According to the above aspect, it is possible to control vehicles without acquiring the state of a traffic light directly from the traffic light.

In the aspect described above, the electronic control unit may be configured to stop following control and control the operation of the vehicle such that the vehicle stops at the traffic light when the electronic control unit performs the following control as the driving assistance for the vehicle and the electronic control unit make a prediction that the vehicle should stop at the traffic light, the following control being control for following a preceding vehicle that travels ahead of the vehicle.

It is required for the driving assistance technology to control the vehicles autonomously according to a change in the traffic lights. For example, while a vehicle is traveling using ACC, the preceding vehicle sometimes enters an intersection just before the traffic light changes to red. In that case, it is thought that the vehicle stops following the preceding vehicle and stops autonomously before the intersection. However, when the technology disclosed in Japanese Patent Application Publication No. 2011-154619 (JP 2011-154619 A) is applied to a vehicle that travels using ACC, there is a possibility that competition occurs between control for following the preceding vehicle and control for autonomously stopping the vehicle.

According to the above aspect, it is possible to control a vehicle in such a way that, when the vehicle is traveling using ACC and the preceding vehicle enters an intersection just before the traffic light turns red, the vehicle stops following the preceding vehicle and stops autonomously before the intersection.

In the aspect described above, the electronic control unit may be configured to perform control for maintaining a line based, on the prediction when the electronic control unit performs, as the driving assistance, line control in such a way that the vehicle and one or more other vehicles travel in the line.

For example, when two or more vehicles are traveling in a line using ACC, it is thought that the line is controlled in such a way that the vehicles maintain the line even when the traffic light changes to red. According to the aspect described above, even when the traffic light changes to red while two or more vehicle are traveling in a line using ACC, it is possible to control the line in such a way that the vehicles still maintain the line.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure will be described in detail below with reference to the drawings. In the description below, the same reference numeral is used for the same or equivalent component.

Overall Structure

Figure 1:
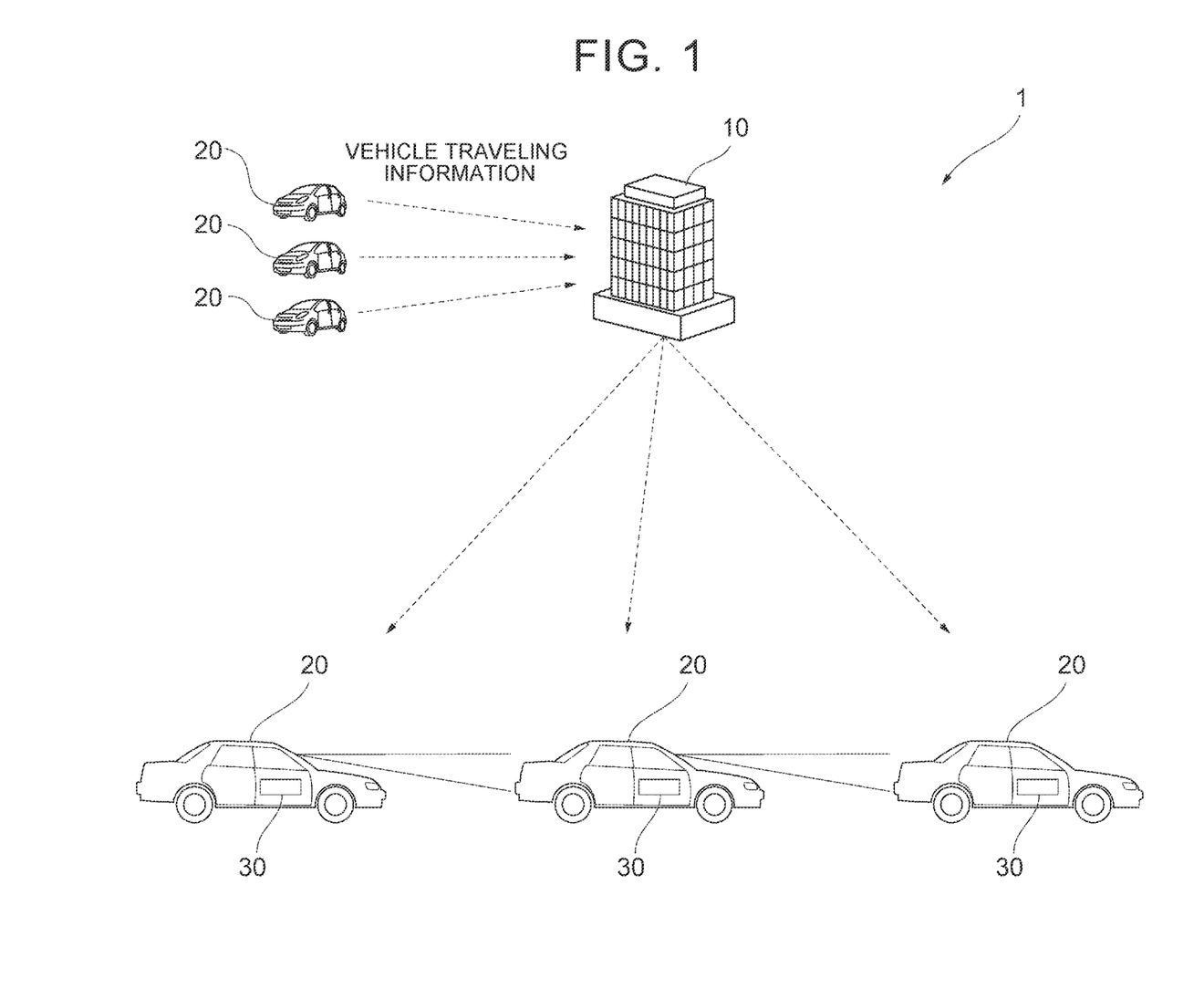
FIG. 1 is a diagram showing an example of a vehicle control system according to an embodiment.

FIG. 1 is a diagram showing an example of a vehicle control system 1 according to the embodiment. As shown in FIG. 1, the vehicle control system 1 includes a server 10 and two or more vehicles 20. Although two or more vehicles 20 are shown in FIG. 1, the number of vehicles included in the vehicle control system 1 is not limited.

The server 10 collects the probe information (vehicle traveling information) from each of a large number of the vehicles 20 traveling on the road. Then, for each of the traffic lights on the road, the server 10 analyzes the collected probe information to estimate the time at which each traffic light will change. The probe information includes data recording the vehicle position and the vehicle speed of each vehicle on a time series basis. More specifically, the probe information may include the vehicle speed, the coordinates indicating the traveling position of the vehicle, the link ID of a link in which the vehicle is traveling, the distance from the traveling position of the host vehicle to the end of a link in which the host vehicle is traveling, and the time stamp.

The server 10 statistically analyzes the stop position, the stop time, and the start time of each vehicle 20 around an intersection, based on the probe information collected from a large number of the vehicles 20, to estimate the time at which each traffic light on the road will change. Estimating the time at which a traffic light will change may include estimating the signal cycle (for example, the duration of each of the stop indication and the proceed indication) and estimating the predetermined reference time (for example, the time at which the traffic light changes from the proceed indication to the stop indication). In this embodiment, a "stop indication", an "an indication of stop", or "displaying a stop indication" means that the traffic light is yellow or red; similarly, a "proceed indication", an "indication of proceed", or "displaying a proceed indication" means that the traffic light is green. Note that these signals are not always indicated by these colors. For example, the stop indication may include the state in which the traffic light blinks red or the state in which the traffic light is red with no arrow signal displayed. Similarly, the proceed indication may include the state in which the traffic light is red with one or more arrow signals displayed. These signals may also include a display that indicates a stop indication, or a display that indicates a proceed indication, according to the laws and regulations of each country.

The vehicle 20, though may be any vehicle that travels on a road, is an automobile in an example in this embodiment. However, this embodiment may be applied not only to an automobile but also, for example, to a motorcycle.

A driving assistance device 30 is a device that communicates with the server 10 for providing driving assistance to a driver who drives the vehicle 20. The driving assistance device 30, mounted on the vehicle 20, basically carries out driving assistance by accelerating/decelerating the vehicle 20 on which the driving assistance device 30 is mounted. The driving assistance device 30 may be an independent device in the vehicle 20, or may be integrated with a car navigation system or another in-vehicle computer.

Operation Outline

Figure 2A:
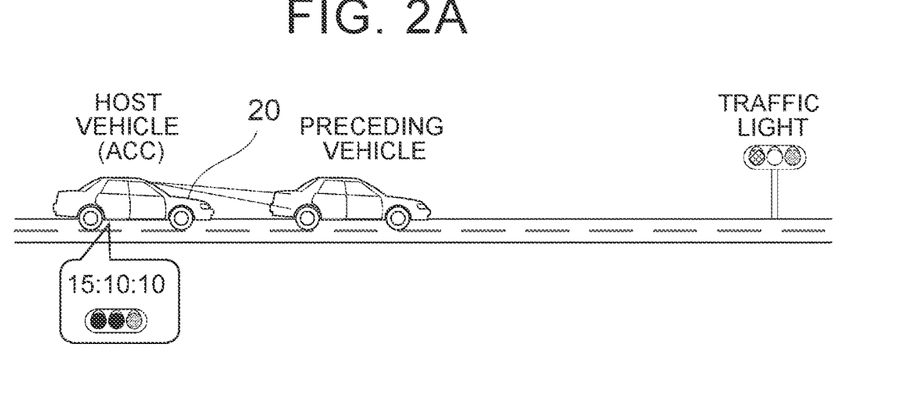
FIG. 2A is a diagram showing an example of the operation performed by the vehicle control system according to the embodiment.
Figure 2B:
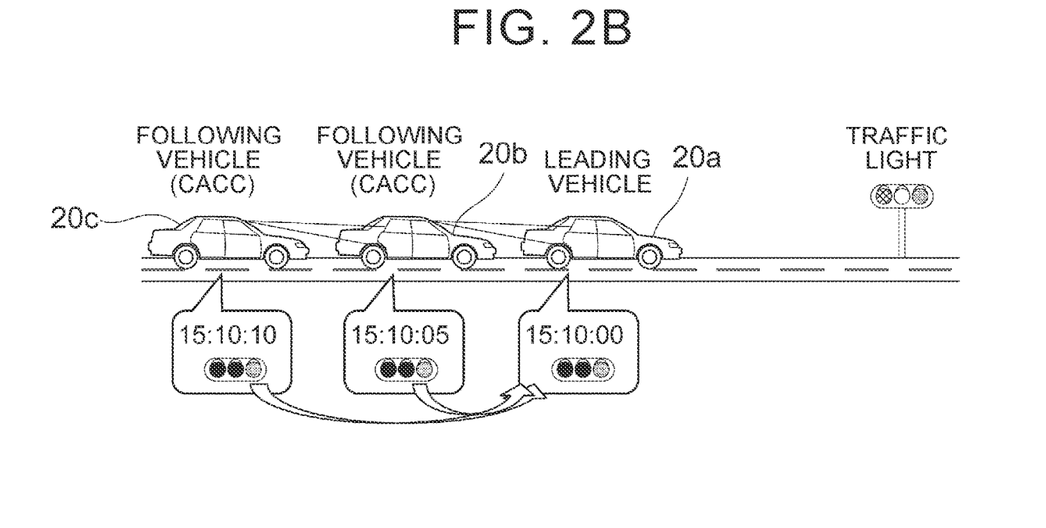
FIG. 2B is a diagram showing another example of the operation performed by the vehicle control system according to the embodiment.
Figure 2C:
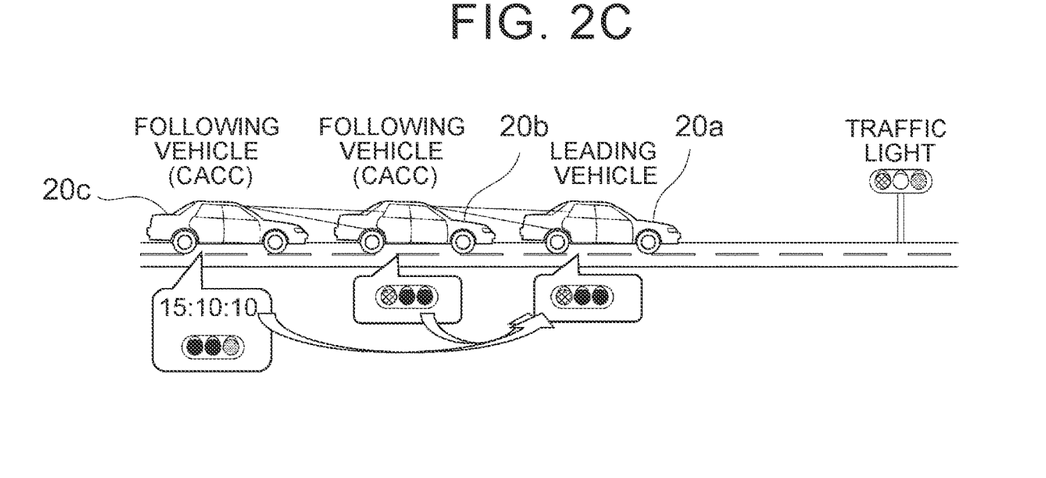
FIG. 2C is a diagram showing still another example of the operation performed by the vehicle control system according to the embodiment.

FIG. 2A, FIG. 2B, and FIG. 2C are diagrams showing an outline of the operation performed by the vehicle control system 1 according to this embodiment. The driving assistance device 30 supports Adaptive Cruise Control (ACC) and/or Cooperative Adaptive Cruise Control (CACC) as the driving assistance control. ACC is a function that allows a vehicle to autonomously travel within a pre-set speed range while maintaining the inter-vehicle distance to the preceding vehicle. CACC is a function that allows two or more vehicles to autonomously travel in a line. CACC, which is an extension to ACC, controls a line of vehicles more accurately. To do so, CACC allows the result, collected by each vehicle by measuring the inter-vehicle distance to the preceding vehicle via the radar, and the control information on the acceleration or deceleration of the preceding vehicle, to be shared with the following vehicles in the line via vehicle-to-vehicle communication.

FIG. 2A shows an outline of the operation when the vehicle 20 is traveling alone (traveling without forming a line) while following the preceding vehicle using the ACC function. The driving assistance device 30, mounted on the vehicle 20, causes the vehicle 20 to travel while measuring the distance to the preceding vehicle by the radar mounted on the vehicle 20 and while maintaining the distance to the preceding vehicle within the preset speed range. In addition, from the server 10, the driving assistance device 30 receives the information that explicitly or implicitly indicates a time at which each traffic light, installed on the road, will display a stop indication (in the description below, this information is referred to as "signal information"). The driving assistance device 30 predicts whether the vehicle 20 should stop at the next traffic signal, based on the traveling state (traveling position, vehicle speed, etc.) of the vehicle 20 and on the time at which the next traffic light on the road, on which the vehicle is traveling, will display a stop indication. If it is predicted that the vehicle 20 should stop at the next traffic light, the driving assistance device 30 controls the vehicle 20 in such a way that the vehicle 20 stops following the preceding vehicle and stops at the next traffic light. Note that, even when the vehicle 20 is traveling alone at a set speed without the preceding vehicle, the driving assistance device 30 performs the processing similar to that described above in such a way that the vehicle 20 stops at the next traffic light.

FIG. 2B and FIG. 2C show an outline of the operation when the vehicles 20 are traveling in a line using the CACC function. In the description below, the vehicle 20 traveling at the head of the line is called a leading vehicle 20 and the second and subsequent vehicles 20 are called following, vehicles 20. In FIG. 2B and FIG. 2C, a leading vehicle 20a and two following vehicles 20b and 20c are traveling in a line. The following vehicle 20b can be said to be a preceding vehicle when viewed from the following vehicle 20c. Also, the leading vehicle 20a can be said to be the preceding vehicle when viewed from the following vehicle 20b. The driving assistance device 30 mounted on the leading vehicle 20a, the following vehicle 20b, and the following vehicle 20c is referred to as a driving assistance device 30a, a driving assistance device 30b, and a driving assistance device 30c, respectively.

When traveling in a line, any one of the leading vehicle 20a, the following vehicle 20b, and the following vehicle 20c functions as a control vehicle that controls the operation of the entire line. In addition, in the driving assistance device 30a, the driving assistance device 30b, and the driving assistance device 30c, the name of the line group and the information for identifying the leading vehicle and the following vehicles in the line are set. Note that which vehicle 20 functions as the control vehicle may be determined by the driver, may be determined based on a predetermined algorithm when forming a line by two or more the vehicles 20, or may be determined randomly. In the description of the operation outline below, it is assumed that the leading vehicle 20a is the control vehicle.

Using the measurement result of the millimeter wave radar mounted on the following vehicle 20b or the following vehicle 20c, each of the driving assistance device 30b and the driving assistance device 30c causes the following vehicle 20b and the following vehicle 20c to travel, respectively, within a preset speed range while keeping the inter-vehicle distance to the leading vehicle 20a, which is the leading vehicle, or to the following vehicle 20b. Each of the driving assistance device 30a, the driving assistance device 30b, and the driving assistance device 30c receives the signal information from the server 10, respectively. In addition, each of the driving assistance device 30a, the driving assistance device 30b, and the driving assistance device 30c predicts whether the leading vehicle 20a, the following vehicle 20b, or the following vehicle 20c should stop at the next traffic light, respectively, based on the traveling state of the leading vehicle 20a, the following vehicle 20b, or the following vehicle 20c and on the time at which the next traffic light on the road, on which the vehicle is traveling, will display a stop indication. The driving assistance device 30b and the driving assistance device 30c send the prediction result to the driving assistance device 30a.

Assume that the driving assistance device 30a, the driving assistance device 30b, and the driving assistance device 30c all predict that the leading vehicle 20a, the following vehicle 20b, and the following vehicle 20c should stop at the next traffic light, as shown in FIG. 2B. In this case, the driving assistance device 30a controls the line in such a way that the entire line stops at the next traffic light. More specifically, the driving assistance device 30a controls the leading vehicle 20a in such a way that the leading vehicle 20a stops at the next signal and, at the same time, instructs the driving assistance device 30b and the driving assistance device 30c to stop the following vehicle 20b and the following vehicle 20c at the next traffic light.

Next, assume that only the driving assistance device 30c predicts that the following vehicle 20c should stop at the next traffic light, as shown in FIG. 2C. In this case, if only the following vehicle 20c stops at the next traffic light, the line will be disturbed. To avoid this, the driving assistance device 30a controls the line in such a way that line is maintained. More specifically, the driving assistance device 30a controls the line in one of the following three ways: that is, the driving assistance device 30a causes the vehicles of the line to stop at the next traffic light, causes the vehicles of the line to accelerate to a speed so that the vehicles can pass the traffic light before the traffic light displays a stop indication, and causes the vehicles of the line to reduce the inter-vehicle distance among the vehicles so that the vehicles can pass the traffic light before the traffic light displays a stop indication.

Note that the leading vehicle 20a can travel while following the preceding vehicle 20 that is not related to the line. In this case, when stopping the line at the next traffic light, the driving assistance device 30a of the leading vehicle 20a controls the line in such a way that the leading vehicle 20a stops following the preceding vehicle and then the line stops.

Functional Configuration

Figure 3:
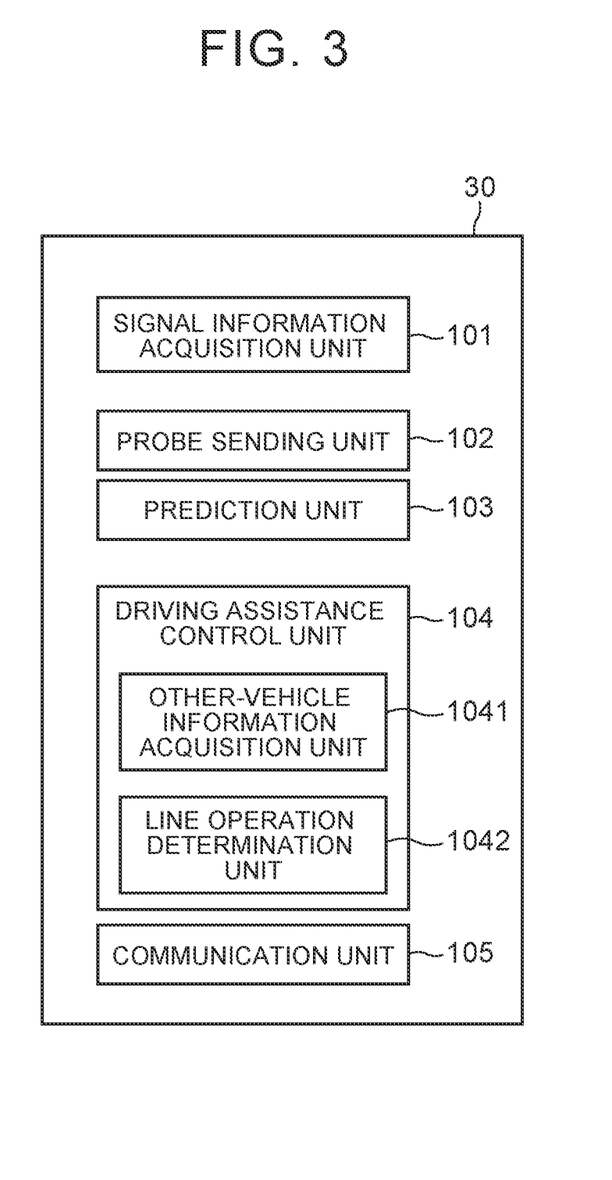
FIG. 3 is a diagram showing an example of a configuration of the functional blocks of a driving assistance device according to the embodiment.

FIG. 3 is a diagram showing an example of a configuration of the functional blocks of the driving assistance device 30 according to this embodiment. The driving assistance device 30 includes a signal information acquisition unit 101, a probe sending unit 102, a prediction unit 103, a driving assistance control unit 104, and a communication unit 105. The signal information acquisition unit 101, the probe sending unit 102, the prediction unit 103, the driving assistance control unit 104, and the communication unit 105 are implemented when the CPU of the driving assistance device 30 executes the programs stored in the memory. The programs can be stored in a recording medium. The recording medium in which the programs are stored may be, a non-transitory recording medium. The non-transitory recording medium is not limited to a particular medium but may be a recording, medium such as a USB memory or a CD-ROM.

The signal information acquisition unit 101 has the function to acquire, from the server 10, the signal information on the traffic lights on the traveling route on which the vehicle 20 travels. The server 10 may broadcast, at a predetermined periodic interval, the signal information on a plurality of traffic lights, installed in a predetermined area, to two or more vehicles 20 that are traveling in the predetermined area. The server 10 may also send the signal information upon receiving a request from the driving assistance device 30. In this case, the signal information acquisition unit 101 may send the ID of a traffic light on the traveling route to the server 10 so that the signal information on that traffic light on the traveling route can be received from the server 10.

The probe sending unit 102 has the function to send the probe information to the server via the communication unit 105. The probe information records the vehicle position of the vehicle 20, on which the driving assistance device 30 is mounted, and the vehicle speed of the vehicle 20 on a time-series basis.

The prediction unit 103 has the function to predict whether the vehicle 20 should stop at a traffic light on the traveling route based on the following two; one is the traveling state (traveling position, vehicle speed, etc.) of the vehicle 20 on which the driving assistance device 30 is mounted, and the other is the time acquired by the signal information acquisition unit 101 and indicating a time at which the traffic light will display a stop indication. In addition, if the host vehicle 20 forms a line with the other vehicles 20 and is not the control vehicle, the prediction unit 103 sends the prediction result to the control vehicle via the communication unit 105. Note that the "host vehicle 20" refers to one of two or more vehicles 20 in a line of the vehicles 20 on each of which the driving assistance device .30 is mounted, and "other vehicles 20" refer to the vehicles 20 which are included in the plurality of vehicles 20 in the line and are not the host vehicle 20.

The driving assistance control unit 104 has the function to control driving assistance such as ACC or CACC and, at the same time, to control the operation of the vehicle 20 at a traffic light on the traveling route based on the prediction result of the prediction unit 103. If it is predicted by the prediction unit 103 that the vehicle 20 should stop at a traffic light, the driving assistance control unit 104 performs control for stopping the vehicle 20 at the traffic light. In addition, if driving assistance for the driver is performed in such a way that the vehicle 20 follows the preceding vehicle traveling ahead of the leading vehicle 20 and if it is predicted by the prediction unit 103 that the vehicle 20 should stop at a traffic light, the driving assistance control unit 104 performs control for causing the vehicle 20 to stop following the preceding vehicle and for stopping the vehicle 20 at the traffic light.

When driving assistance for the drivers is performed in such a way that the vehicles 20 travel in a line and when the host vehicle 20 is the control vehicle, the driving assistance control unit 104 performs control for maintaining the line based on the prediction result of the prediction unit 103. On the other hand, when the vehicles 20 are controlled in such a way that the vehicles 20 travel in a line but when the host vehicle 20 is not the control vehicle, the driving assistance control unit 104 performs control for accelerating, decelerating, or stopping the host vehicle 20, or for changing the inter-vehicle distance, according to an instruction from the vehicle 20 that is the control vehicle.

Furthermore, the driving assistance control unit 104 includes an other-vehicle information acquisition unit 1041 and a line operation determination unit 1042. When the host vehicle 20 is the control vehicle of a line, the other-vehicle information acquisition unit 1041 has the function to acquire, from the other vehicles 20 included in the line, the prediction result as to whether the other vehicles 20 should stop at a traffic light. When the host vehicle 20 is the control vehicle, the line operation determination unit 1042 has the function to determine an operation of the entire line, which is to be performed to maintain the line, based on the prediction result of the prediction unit 103 and the prediction results of the other vehicles 20 acquired by the other-vehicle information obtaining unit 1041, The line operation determination unit 1042 notifies (instructs, about) the content of the determined operation to the other vehicles 20 via the communication unit 105.

If it is predicted that the host vehicle 20 or at least one or more of the other vehicles 20 in a line should stop at a traffic light, the line operation determination unit 1042 may determine whether to accelerate the line or stop the line or whether to reduce the inter-vehicle distance among the vehicles in the line. More specifically, if it is predicted that, by accelerating the line, the line can pass the traffic light before the traffic light displays a stop indication, the line operation determination unit 1042 may accelerate the line. Similarly, if it is predicted that, by reducing the inter-vehicle distance, the line can pass the traffic light before the traffic light displays a stop indication, the driving assistance control unit 104 may reduce the inter-vehicle distance among .the vehicles in the line. Conversely, if it is predicted that the line cannot pass the traffic light before the traffic light displays a stop indication even if control for accelerating the line is performed or control for reducing the inter-vehicle distance is performed, the driving assistance control unit 104 may stop the line at the traffic light.

The communication unit 105 has the function to communicate with the server 10 and the other vehicles 20 using wireless communication. The communication unit 105 may communicate with the other vehicles 20 via base stations that are the communication facilities of mobile radio communication (such as LTE), or may directly communicate with the other vehicles 20, not via base stations, but via D2D (Device to Device) communication.

Figure 4:
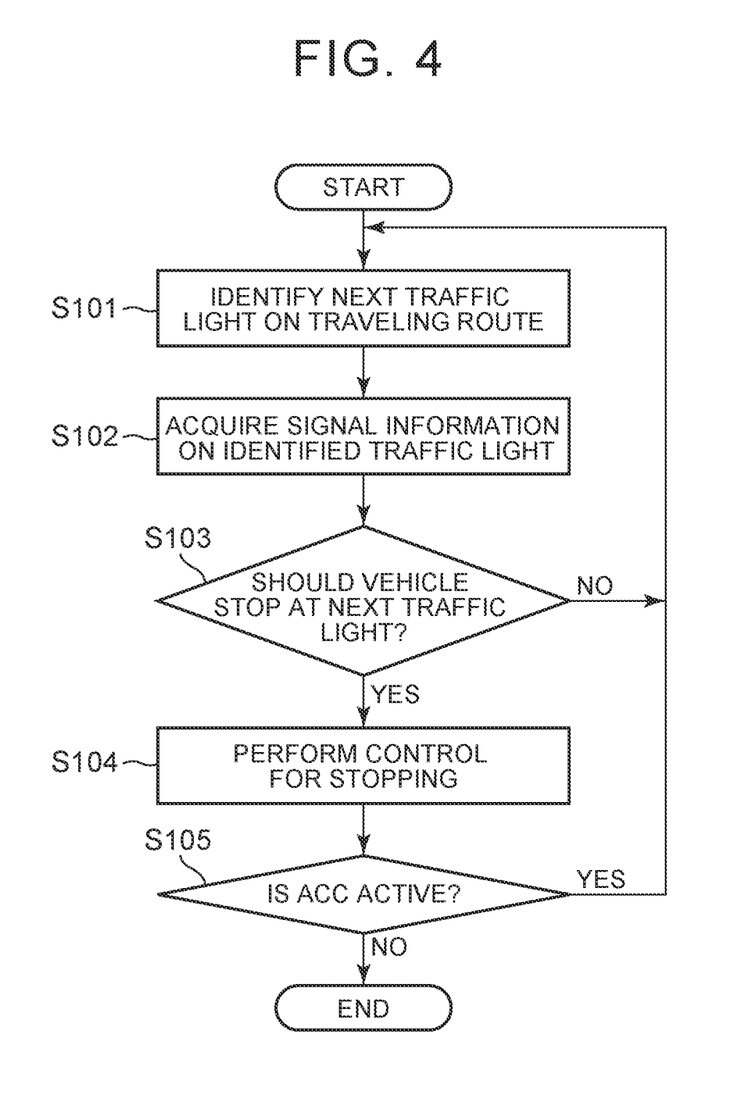
FIG. 4 is a flowchart showing an example of a processing procedure performed by the driving assistance device when a vehicle is traveling alone.

Processing Flow (When traveling alone) FIG. 4 is a flowchart showing an example of a processing procedure performed by the driving assistance device 30 when the vehicle 20 travels alone. The processing performed by the driving assistance device 30 of the vehicle 20 that travels alone using ACC will be described below with reference to FIG. 4. For the sake of description, it is assumed in the description below that the traffic light displays a stop indication is equivalent to that the traffic light is yellow or red and that the traffic light displays a proceed indication is equivalent to that the traffic light is green.

First, the signal information acquisition unit 101 references the map information to identify a traffic light that the vehicle 20 will pass next on the traveling route on which the vehicle 20 is traveling (S101). Next, the signal information acquisition unit 101 acquires the signal information on the identified traffic light (S102). In the signal information, the information indicating the signal cycle (the duration of each of the yellow signal, the red signal, and the green signal) and the information indicating the predetermined reference time (for example, the time used as the reference when calculating a time at which the traffic light changes from green to yellow) may be associated with the information identifying the traffic light (such as the ID of the traffic light). The information indicating the signal cycle is, for example, the information indicating that the traffic light changes at a cycle of the yellow signal (5 seconds), the red signal (85 seconds), and the green signal (90 seconds). The information indicating the predetermined reference time is, for example, the information indicating that the traffic light changes from green to yellow with 0:00:00 as the reference time. Since one cycle of this traffic light is three minutes (5 seconds+85 seconds+90 seconds=180 seconds), the time at which the traffic light changes from green to yellow is calculated as 0:03:00, 0:06:00, 0:09:00, and so on. The example given above is exemplary only. As long as the driving assistance device 30 can recognize the time at which, the traffic light changes, the signal information may be in any format.

Next, the prediction unit 103 predicts whether the vehicle 20 can pass the next traffic light while it is green if the vehicle travels to the next traffic light while keeping the current vehicle speed. For example, the prediction unit 103 calculates the distance from the current traveling position of the vehicle 20 to the next traffic light on the traveling route and, based on the calculated distance and the current vehicle speed, calculates the scheduled time at which the vehicle 20 will pass the next traffic light. If the traffic light is green at the scheduled time at which the vehicle 20 will pass the next traffic light, the prediction unit 103 predicts that the vehicle 20 can pass the next traffic light. On the other hand, if the traffic light is yellow or red at the time at which the vehicle 20 will pass the next traffic light, the prediction unit 103 predicts that the vehicle 20 should stop before the traffic light. If it is predicted that the vehicle 20 can pass the next traffic light (step 103—NO), the processing returns to the processing procedure in step S101 to perform the similar processing for the traffic light that is identified next. On the other hand, if it is predicted by the prediction unit 103 that the vehicle 20 should stop before the traffic light (step 103—YES), the processing proceeds to step S104.

Next, the driving assistance control unit 104 controls the vehicle 20 in such a way that the vehicle 20 stops at the next traffic light (S104). At this time, if the preceding vehicle that the vehicle 20 is following using the ACC function does not reduce the speed, the driving assistance control unit 104 controls the speed of the vehicle 20 in such a way that the vehicle 20 stops following the preceding vehicle and stops at the next traffic light. On the other hand, if the preceding vehicle reduces the speed, the driving assistance control unit 104 controls the vehicle speed of the vehicle 20 in such a way that the vehicle 20 stops at the next traffic light while maintaining the inter-vehicle distance long enough to avoid a collision with the preceding vehicle.

While the ACC function is active, the driving assistance device 30 repeats the processing procedure in steps S101 to S104 (S105).

Figure 5:
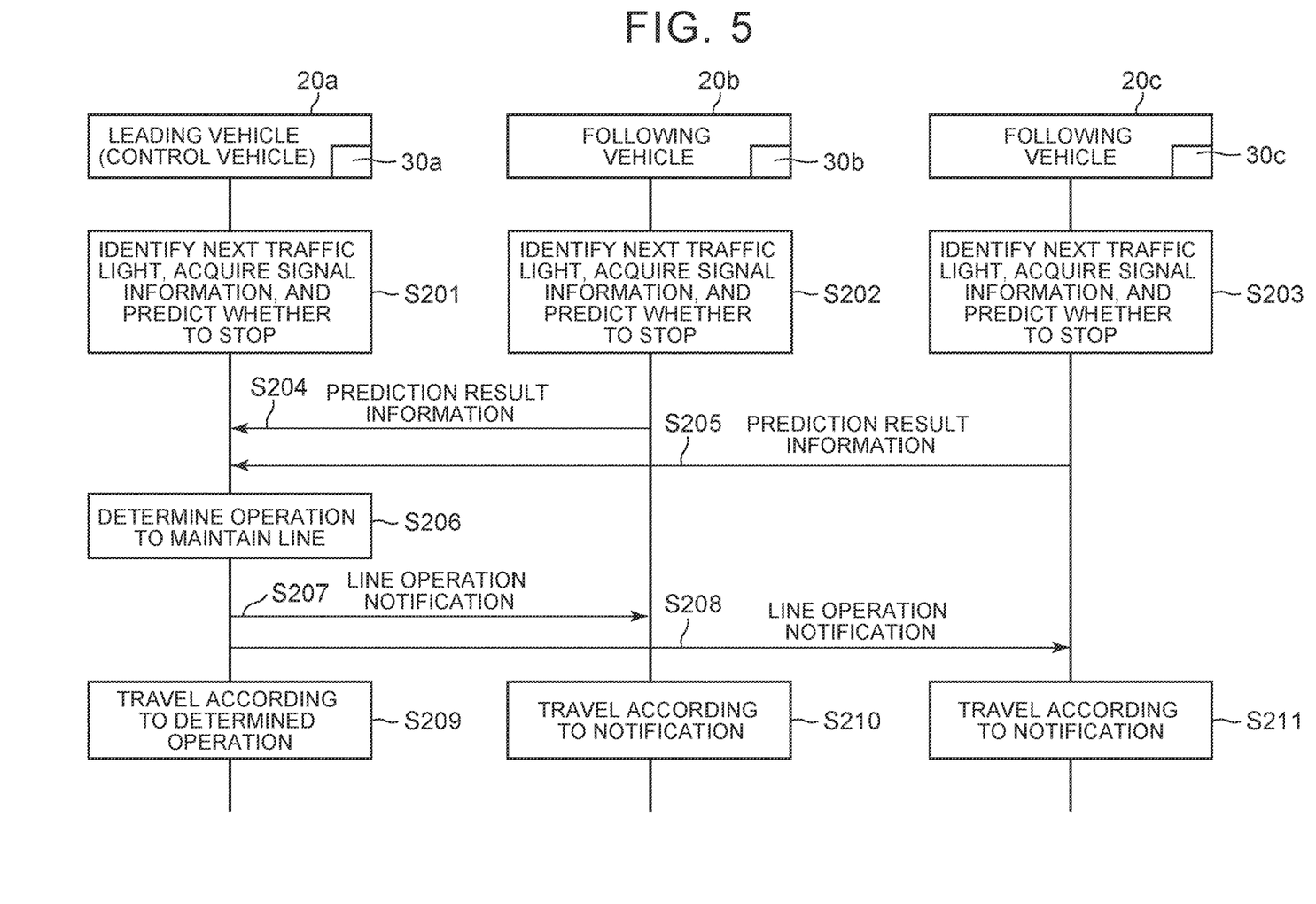
FIG. 5 is a sequence diagram showing an example of a processing procedure performed by the driving assistance device in each vehicle when the vehicles are traveling in a line.

(When traveling in a line) FIG. 5 is a sequence diagram showing an example of the processing procedure performed by the driving assistance device 30 in each vehicle when the vehicles travel in a line. The processing performed by the driving assistance device 30 of each of the vehicles 20 that are traveling in a line using CACC will be described with reference to FIG. 5. In the example shown in FIG. 5, it is assumed that the leading vehicle 20a is the control vehicle and that three vehicles 20—leading vehicle 20a, following vehicle 20b, and following vehicle 20c—are traveling in a line.

First, the driving assistance device 30a of the leading vehicle 20a performs the processing for identifying a traffic light that the leading vehicle 20a will pass next on the traveling route on which the leading vehicle 20a is traveling, the processing for acquiring the signal information on the next traffic light, and the processing for predicting whether to stop at the next traffic light (S201). The driving assistance device 30b of the following vehicle 20b and the driving assistance device 30c of the following vehicle 20c also perform the same processing (S202, S203). The processing procedure in step S201, step S202 and step S203 is the same as the processing procedure in step S101 to step S103 in FIG. 4 and, therefore, the description will be omitted.

Next, the prediction unit 103 of the following vehicle 20b and the prediction unit 103 of the following vehicle 20c respectively notify the leading vehicle 20a about the prediction result as to whether to stop at the next traffic light. The other-vehicle information acquisition unit 1041 of the leading vehicle 20a acquires the prediction result from the following vehicle 20b and the following vehicle 20c (S204, S205). Next, based on the prediction result made by the prediction unit 103 of the leading vehicle 20a and the prediction result acquired from the following vehicle 20b and the following vehicle 20c, the line operation determination unit 1042 of the leading vehicle 20a determines the operation to maintain the line (to continue the current traveling, to accelerate to a predetermined speed, to stop at the next signal, or to reduce the inter-vehicle distance) (S206). The driving assistance control unit 104 of the leading vehicle 20a notifies the following vehicle 20b and the following vehicle 20c about the content of the determined operation (S207, S208). Then, the driving assistance control unit 104 of the leading vehicle 20a controls the traveling of the leading vehicle 20a according to the determined line maintenance operation (S209). The driving assistance control unit 104 of the following vehicle 20b and the following vehicle 20c controls the traveling of the following vehicle 20b and the following vehicle 20c according to the line operation notified from the leading vehicle 20a (S210, S211).

Figure 6:
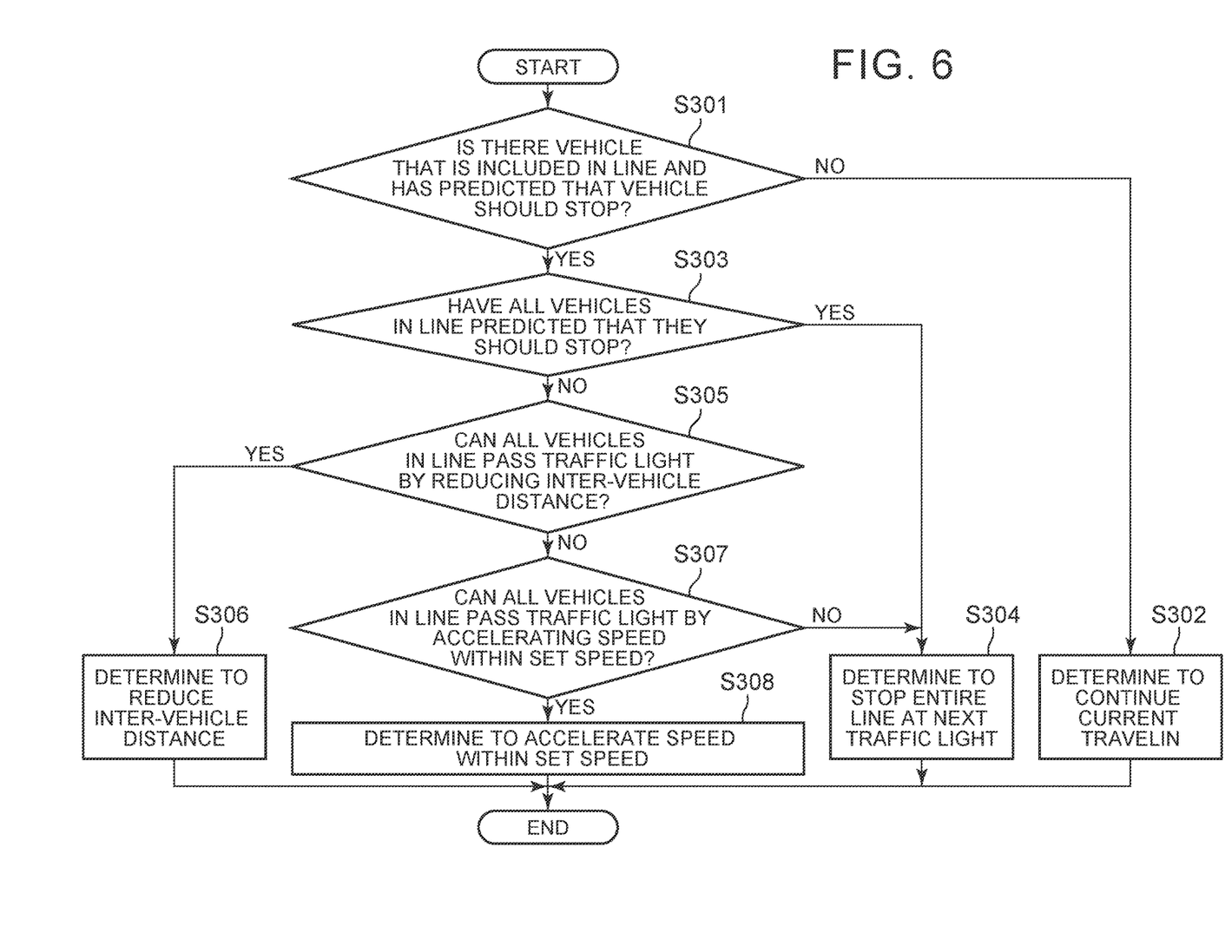
FIG. 6 is a flowchart showing an example of a processing procedure for determining an operation performed for maintaining a line.

FIG. 6 is a flowchart showing an example of the processing procedure for determining the operation to be performed for maintaining a line. The processing procedure in step S206 in FIG. 5 will be described in detail below with reference to FIG. 6.

First, the line operation determination unit 1042 determines whether there is at least one vehicle 20 that is included in the vehicles 20 in the line and has predicted to stop at the next traffic light (S301). If there is no such vehicle 20 (S301—NO), the line operation determination unit 1042 determines to continue the current traveling as the operation to maintain the line (S302). On the other hand, if there is at least one vehicle 20 that has predicted that the vehicle 20 should stop at the next traffic light (S301—YES), the line operation determination unit 1042 determines whether all the vehicles 20 in the line have predicted that they should stop at the next traffic light (S303). If all the vehicles 20 have predicted that they should stop at the next traffic light (S303—YES), the line operation determination unit 1042 determines to stop the entire line at the next traffic light as the operation of maintaining the line (S304).

On the other hand, if only a part of the vehicles 20 in the line have predicted that they should stop at the next traffic light (S303—NO), the line operation determination unit 1042 determines whether all the vehicles 20 in the line can pass the traffic light while the next traffic light is green by reducing the inter-vehicle distance among the vehicles in the line (S305). If it is determined that the vehicles 20 can pass the traffic light by reducing the inter-vehicle distance, the line operation determination unit 1042 determines to reduce the inter-vehicle distance among the vehicles as the operation to maintain the line (S306). At this time, the line operation determination unit 1042 may determine a specific inter-vehicle distance (for example, 5 m) between the vehicles 20. The determined inter-vehicle distance is notified to each vehicle 20 in the line by the processing procedure in steps S207 and S208 in FIG. 5.

Next, if it is determined that the all the vehicles 20 in the line cannot pass the next traffic light by reducing the inter-vehicle distance (S305—NO), the line operation determination unit 1042 determines whether all the vehicles 20 can pass the next traffic light by accelerating the speed within the set speed (S307). Ii should be noted here that, if the leading vehicle 20a is following the preceding vehicle 20 that is not related to the line, it is difficult to accelerate the speed unless the leading vehicle 20a passes the preceding vehicle 20. In this case, the line operation determination unit 1042 may determine that it is impossible to accelerate the speed and the processing may proceed to the processing procedure in step S304.

If it is determined that all the vehicles 20 in the line can pass the next traffic light by accelerating the speed within the set speed (S307—YES), the line operation determination unit 1042 determines to accelerate the speed within the set speed as the operation to maintain the line (S308). At this time, the line operation determination unit 1042 may determine a specific vehicle speed after the acceleration. The determined vehicle speed is notified to each vehicle 20 in the line by the processing procedure in steps S207 and S208 in FIG. 5. On the other hand, if it is determined that all the vehicles 20 in the line cannot pass the next traffic light by accelerating the speed within the set speed (S307—NO), the processing of the line operation determination unit 1042 proceeds to the processing procedure in step S304.

Others

The above described embodiment is intended to help understand the present disclosure and is not intended to limit the present disclosure. The flowcharts and the sequence described in the embodiment, the components of the embodiment, and the arrangement, materials, conditions, shapes, and sizes of the components are not limited to those illustrated, but can be appropriately changed. In addition, the configurations shown in different embodiments may be replaced or combined in part. Note that the server 10 is an example of an information processing device.

What is claimed is:

1. A driving assistance device that communicates with an information processing device for providing driving assistance for a host vehicle, the driving assistance device comprising an electronic control unit configured to:
    acquire signal information from the information processing device, the signal information indicating a time at which a traffic light on a traveling route displays a stop indication, the traveling route being a route on which the host vehicle is traveling;
    make a prediction whether the host vehicle should stop at the traffic light, based on a traveling state of the host vehicle and the signal information;
    perform the driving assistance;
    control an operation of the host vehicle around the traffic light based on the prediction; and
    execute a following control, the following control being a control for following a preceding vehicle that travels ahead of the host vehicle,
    wherein the electronic control unit is configured to stop the following control and control the operation of the host vehicle such that the host vehicle stops at the traffic light when the electronic control unit performs the following control as the driving assistance for the host vehicle and the electronic control unit makes the prediction that the host vehicle should stop at the traffic light,
    wherein when the host vehicle forms a line with one or more other vehicles and the host vehicle is not a control vehicle, the electronic control unit is configured to send the prediction to the control vehicle among the one or more other vehicles, and
    wherein when the host vehicle forms the line with the one or more other vehicles and the host vehicle is the control vehicle, the electronic control unit is configured to receive another prediction from at least one of the one or more other vehicles and determine an operation to maintain the line based on the received prediction and the prediction by the electronic control unit.

2. The driving assistance device according to claim 1, wherein the electronic control unit is configured to perform the operation for maintaining the line based on the received prediction and the made prediction when the electronic control unit performs, as the driving assistance, line control in such a way that the host vehicle and the one or more other vehicles travel in the line.

3. The driving assistance device according to claim 2, wherein the electronic control unit is configured to:
    control, when the host vehicle or the at least one of the one or more other vehicles forming the line should stop at the traffic light, the operation of the host vehicle such that the line accelerates or stops, or such that an inter-vehicle distance in the line reduces.

4. The driving assistance device according to claim 3, wherein the electronic control unit is configured to:
    control the operation of the host vehicle such that the line accelerates when the electronic control unit determines that the line can pass, by accelerating, the traffic light before the traffic light displays the stop indication;
    control the operation of the host vehicle such that the inter-vehicle distance in the line reduces when the electronic control unit determines that the line can pass, by such a way that the inter-vehicle distance in the line reduces, the traffic light before the traffic light displays the stop indication; and
    control the operation of the host vehicle such that the line at the traffic light stops when the electronic control unit determines that the line cannot pass the traffic light before the traffic light displays the stop indication.

5. The driving assistance device according to claim 1, wherein the electronic control unit is configured to send vehicle traveling information to the information processing device, the vehicle traveling information being stored in the information processing device to record at least a vehicle position of the host vehicle and a vehicle speed of the host vehicle on a time-series basis.

6. A driving assistance method performed by a driving assistance device that communicates with an information processing device for providing driving assistance for a host vehicle, the driving assistance method comprising:
    acquiring, by the driving assistance device, signal information from the information processing device, the signal information indicating a time at which a traffic light on a traveling route displays a stop indication, the traveling route being a route on which the host vehicle is traveling;
    making, by the driving assistance device, a prediction whether the host vehicle should stop at the traffic light, based on a traveling state of the host vehicle and the signal information;
    performing, by the driving assistance device, the driving assistance;
    controlling, by the driving assistance device, an operation of the host around the traffic light based on the prediction;
    performing, by the driving assistance device, a following control for following a preceding vehicle that travels ahead of the host;
    stopping the following control and controlling, by the driving assistance device, the operation of the host such that the host stops at the traffic light when the driving assistance device performs the following control as the driving assistance for the host and the driving assistance device makes the prediction that the host should stop at the traffic light;
    sending the prediction to a control vehicle among one or more other vehicles when the host vehicle forms a line with one or more other vehicles and the host vehicle is not the control vehicle;
    receiving another prediction from at least one of the one or more other vehicles when the host vehicle forms the line with the one or more other vehicles and the host vehicle is the control vehicle; and
    determining an operation to maintain the line based on the received prediction and the made prediction in response to receiving the another prediction from the at least one of the one or more other vehicles when the host vehicle forms the line with the one or more other vehicles and the host vehicle is the control vehicle.

7. A computer-readable, non-transitory recording medium storing a program, wherein
    a computer communicates with an information processing device for providing driving assistance for a host vehicle, the program causing the computer to:
    acquire signal information from the information processing device, the signal information indicating a time at which a traffic light on a traveling route displays a stop indication, the traveling route being a route on which the host vehicle is traveling;

make a prediction whether the host vehicle should stop at the traffic light, based on a traveling state of the host vehicle and the signal information;

perform the driving assistance;

control an operation of the host vehicle around the traffic light based on the prediction;

perform a following control for following a preceding vehicle that travels ahead of the host vehicle;

stop the following control and control the operation of the host vehicle such that the host vehicle stops at the traffic light when the computer performs the following control as the driving assistance for the host vehicle and the computer makes the prediction that the host vehicle should stop at the traffic light;

sending the prediction to a control vehicle among one or more other vehicles when the host vehicle forms a line with one or more other vehicles and the host vehicle is not the control vehicle;

receiving another prediction from at least one of the one or more other vehicles when the host vehicle forms the line with the one or more other vehicles and the host vehicle is the control vehicle; and determining an operation to maintain the line based on the received prediction and the made prediction in response to receiving the another prediction from the at least one of the one or more other vehicles when the host vehicle forms the line with the one or more other vehicles and the host vehicle is the control vehicle.

8. The driving assistance method according to claim 6 further comprising:

performing, by the driving assistance device, the operation for maintaining the line based on the received prediction and the made prediction when the driving assistance device performs, as the driving assistance, line control in such a way that the host vehicle and the one or more other vehicles travel in the line.

9. The driving assistance method according to claim 8 further comprising:

controlling, by the driving assistance device, when the host vehicle or the at least one of the one or more other vehicles forming the line should stop at the traffic light, the operation of the host vehicle such that the line accelerates or stops, or such that an inter-vehicle distance in the line reduces.

10. The driving assistance method according to claim 9 further comprising:

controlling, by the driving assistance device, the operation of the host vehicle such that the line accelerates when the driving assistance device determines that the line can pass, by accelerating, the traffic light before the traffic light displays the stop indication;

controlling, by the driving assistance device, the operation of the host vehicle such that the inter-vehicle distance in the line reduces when the driving assistance device determines that the line can pass, by such a way that the inter-vehicle distance in the line reduces, the traffic light before the traffic light displays the stop indication; and controlling, by the driving assistance device, the operation of the host vehicle such that the line at the traffic light stops when the driving assistance device determines that the line cannot pass the traffic light before the traffic light displays the stop indication.

11. The driving assistance method according to claim 6 further comprising:

sending vehicle traveling information to the information processing device, the vehicle traveling information being stored in the information processing device to record at least a vehicle position of the vehicle and a vehicle speed of the host vehicle on a time-series basis.

12. The computer-readable, non-transitory recording medium according to claim 7, wherein the program causing the computer to:

perform the operation for maintaining the line based on the received prediction and the made prediction when the computer performs, as the driving assistance, line control in such a way that the host vehicle and one or more other vehicles travel in the line.

13. The computer-readable, non-transitory recording medium according to claim 12, wherein the program causing the computer to:

control when the host vehicle or the at least one of the one or more other vehicles forming the line should stop at the traffic light, the operation of the host vehicle such that the line accelerates or stops, or such that an inter-vehicle distance in the line reduces.

14. The computer-readable, non-transitory recording medium according to claim 13, wherein the program causing the computer to:

control the operation of the host vehicle such that the line accelerates when the computer determines that the line can pass, by accelerating, the traffic light before the traffic light displays the stop indication;

control the operation of the host vehicle such that the inter-vehicle distance in the line reduces when the computer determines that the line can pass, by such a way that the inter-vehicle distance in the line reduces, the traffic light before the traffic light displays the stop indication; and control the operation of the host vehicle such that the line at the traffic light stops when the computer determines that the line cannot pass the traffic light before the traffic light displays the stop indication.

15. The computer-readable, non-transitory recording medium according to claim 7, wherein the program causing the computer to:

send vehicle traveling information to the information processing device, the vehicle traveling information being stored in the information processing device to record at least a vehicle position of the vehicle and a vehicle speed of the host vehicle on a time-series basis.

* * * * *